US008625415B2

(12) United States Patent
Sebire et al.

(10) Patent No.: US 8,625,415 B2
(45) Date of Patent: Jan. 7, 2014

(54) DYNAMIC BUFFER STATUS REPORT SELECTION FOR CARRIER AGGREGATION

(75) Inventors: Benoist P. Sebire, Tokyo (JP); Claudio Rosa, Randers (DK); Chunli Wu, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 515 days.

(21) Appl. No.: 12/753,257

(22) Filed: Apr. 2, 2010

(65) Prior Publication Data

US 2011/0242972 A1 Oct. 6, 2011

(51) Int. Cl.
H04L 12/26 (2006.01)

(52) U.S. Cl.
USPC .......................................................... 370/229

(58) Field of Classification Search
None
See application file for complete search history.

(56) References Cited

U.S. PATENT DOCUMENTS

| 2005/0259662 A1* | 11/2005 | Kim et al. ................ 370/395.4 |
| 2006/0190997 A1* | 8/2006 | Mahajani et al. ............... 726/10 |
| 2007/0201369 A1* | 8/2007 | Pedersen et al. ............ 370/235 |
| 2009/0113086 A1* | 4/2009 | Wu et al. ........................ 710/56 |
| 2009/0125650 A1 | 5/2009 | Sebire ............................ 710/57 |
| 2010/0150082 A1* | 6/2010 | Shin et al. ..................... 370/329 |
| 2011/0170495 A1* | 7/2011 | Earnshaw et al. ............ 370/329 |

FOREIGN PATENT DOCUMENTS

EP   1 909 442 A2   4/2008

OTHER PUBLICATIONS

3GPP TR 36.913 V9.0.0 "3$^{rd}$ General Partnership Project; Technical Specification Group Radio Access Network; Requirements for further advancements for Evolved Universal Terrestrial Radio Access(E-UTRA) (LTE-Advanced) (Release 9)", Dec. 2009, 15 pgs.
3GPP TS 36.300 V8.11.0 "3$^{rd}$ I General Partnership Project; Technical Specification Group Radio Access Network; Evolved Universal Terrestrial Radio Access (E-UTRA) and Evolved Universal Terrestrial Radio Access Network (E-UTRA) Overall description; Stage 2 (Release 8)", Dec. 2009, 148 pgs.
3GPP TSG-RAN WG2#60, Korea, Jeju, "Optimized Buffer Status Reporting", R2-074992, (Nov. 5-9, 2007), (5 pages).
3GPP TSG-RAN WG2 #66, San Francisco, "Impact of Carrier Aggregation on the L2 Protocol Architecture for LTE Rel-10", R2-092957, (May 4-8, 2009), (8 pages).
3GPP TSG-RAN WG2 Meeting #52, Athens, Greece, "Buffer Reporting for E-UTRAN", (Mar. 27-31, 2006), (6 pages).
ETSI TS 136 321 V9.2.0 (Jan. 2010), Technical Specification, "LTE; Evolved Universal Terrestrial Radio Access (E-UTRA); Medium Access Control (MAC) Protocol Specification (3GPP TS 36.321 version 9.2.0 Release 9)", (50 pages).

(Continued)

Primary Examiner — Chirag Shah
Assistant Examiner — Amar Persaud
(74) Attorney, Agent, or Firm — Harrington & Smith

(57) ABSTRACT

In one exemplary aspect of this invention a method includes buffering data in a user equipment and, in response to an amount of buffered data exceeding a threshold value, triggering the generation of a buffer status report and the sending of the buffer status report to a network access node, where the threshold value is a function of the capacity of a currently allocated uplink data transmission resource and some certain amount of time. In another exemplary embodiment the triggering of the generation of the buffer status report and the sending of the buffer status report to a network access node occurs when an amount of buffered data in a buffer of a particular logical channel group exceeds a maximum value associated with one of a plurality of buffer status report tables that is currently in use.

32 Claims, 5 Drawing Sheets

(56) References Cited

OTHER PUBLICATIONS

"MAC Header Format for LTE-A", Samsung, 3GPP TSG-RAN WG2 #67, R2-094857, Aug. 24-28, 2009, 3 pgs.

"Buffer Size Levels for BSR in E-UTRA Uplink" Ericsson, Nokia Corporation, Nokia Siemens Networks, Samsung, 3GPP TSG-RAN WG2 Meeting #62 bis, R2-083101, Jun. 30-Jul. 4, 2008, 3 pages.

"3$^{rd}$ 1 General Partnership Project; Technical Specification Group Radio Access Network; Evolved Universal Terrestrial Radio Access (E-UTRA) Medium Access Control (MAC) protocol specification (Release 9)", 3GPP TS 36.321 V9.1.0, Dec. 2009, 48 pgs.

"3$^{rd}$ General Partnership Project; Technical Specification Group Radio Access Network; Feasibility Study For Further Advancements for E-UTRA (LTE-Advanced) (Release 9)", 3GPP TS 36.912 V9.1.0, Dec. 2009, 58 pgs.

3GPP TS 36.300, V9.1.0 (Sep. 2009) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), (165 pages).

* cited by examiner

SHORT BSR AND TRUNCATED BSR MAC CONTROL ELEMENT
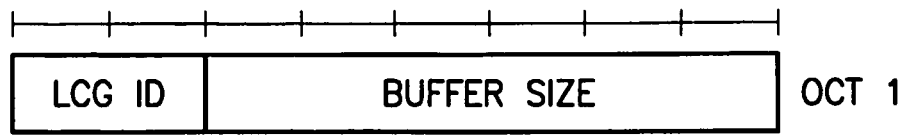
FIG.3A
LONG BSR MAC CONTROL ELEMENT
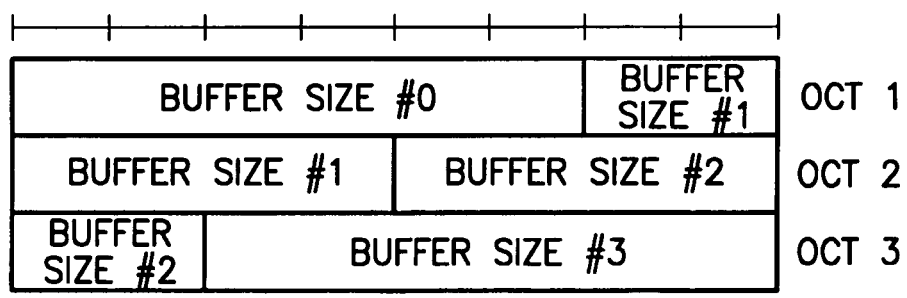
FIG.3B
VALUES OF LCID FOR UL-SCH
| INDEX | LCID VALUES |
|---|---|
| 00000 | CCCH |
| 00001– 01010 | IDENTITY OF THE LOGICAL CHANNEL |
| 01011– 11001 | RESERVED |
| 11010 | POWER HEADROOM REPORT |
| 11011 | C-RNTI |
| 11100 | TRUNCATED BSR |
| 11101 | SHORT BSR |
| 11110 | LONG BSR |
| 11111 | PADDING |
FIG.3D

| INDEX | BUFFER SIZE (BS) VALUE [BYTES] | INDEX | BUFFER SIZE (BS) VALUE [BYTES] |
|---|---|---|---|
| 0 | BS=0 | 32 | 1132<BS<=1326 |
| 1 | 0<BS<=10 | 33 | 1326<BS<=1552 |
| 2 | 10<BS<=12 | 34 | 1552<BS<=1817 |
| 3 | 12<BS<=14 | 35 | 1817<BS<=2127 |
| 4 | 14<BS<=17 | 36 | 2127<BS<=2490 |
| 5 | 17<BS<=19 | 37 | 2490<BS<=2915 |
| 6 | 19<BS<=22 | 38 | 2915<BS<=3413 |
| 7 | 22<BS<=26 | 39 | 3413<BS<=3995 |
| 8 | 26<BS<=31 | 40 | 3995<BS<=4677 |
| 9 | 31<BS<=36 | 41 | 4677<BS<=5476 |
| 10 | 36<BS<=42 | 42 | 5476<BS<=6411 |
| 11 | 42<BS<=49 | 43 | 6411<BS<=7505 |
| 12 | 49<BS<=57 | 44 | 7505<BS<=8787 |
| 13 | 57<BS<=67 | 45 | 8787<BS<=10287 |
| 14 | 67<BS<=78 | 46 | 10287<BS<=12043 |
| 15 | 78<BS<=91 | 47 | 12043<BS<=14099 |
| 16 | 91<BS<=107 | 48 | 14099<BS<=16507 |
| 17 | 107<BS<=125 | 49 | 16507<BS<=19325 |
| 18 | 125<BS<=146 | 50 | 19325<BS<=22624 |
| 19 | 146<BS<=171 | 51 | 22624<BS<=26487 |
| 20 | 171<BS<=200 | 52 | 26487<BS<=31009 |
| 21 | 200<BS<=234 | 53 | 31009<BS<=36304 |
| 22 | 234<BS<=274 | 54 | 36304<BS<=42502 |
| 23 | 274<BS<=321 | 55 | 42502<BS<=49759 |
| 24 | 321<BS<=376 | 56 | 49759<BS<=58255 |
| 25 | 376<BS<=440 | 57 | 58255<BS<=68201 |
| 26 | 440<BS<=515 | 58 | 68201<BS<=79846 |
| 27 | 515<BS<=603 | 59 | 79846<BS<=93479 |
| 28 | 603<BS<=706 | 60 | 93479<BS<=109439 |
| 29 | 706<BS<=826 | 61 | 109439<BS<=128125 |
| 30 | 826<BS<=967 | 62 | 128125<BS<=150000 |
| 31 | 967<BS<=1132 | 63 | BS>150000 |

FIG.3C

DYNAMIC BUFFER STATUS REPORT SELECTION FOR CARRIER AGGREGATION

TECHNICAL FIELD

The exemplary and non-limiting embodiments of this invention relate generally to wireless communication systems, methods, devices and computer programs and, more specifically, relate to techniques to formulate reports for a network access element, where the reports are indicative of an amount of data that is buffered in a user equipment.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
BS base station
BSR buffer status report
BW bandwidth
CA carrier aggregation
CC component carrier
CE control element
CQI channel quality indicator
DL downlink (eNB towards UE)
eNB E-UTRAN Node B (evolved Node B)
EPC evolved packet core
E-UTRAN evolved UTRAN (LTE)
IMTA international mobile telecommunications association
ITU-R international telecommunication union-radiocommunication sector
LCG logical channel group
LTE long term evolution of UTRAN (E-UTRAN)
LTE-A LTE advanced
MAC medium access control (layer 2, L2)
MCS modulation coding scheme
MIMO multiple input/multiple output
MM/MME mobility management/mobility management entity
NodeB base station
OFDMA orthogonal frequency division multiple access
OAM operations and maintenance
PDCCH physical downlink control channel
PDCP packet data convergence protocol
PDU protocol data unit
PHR power headroom report
PHY physical (layer 1, L1)
Rel release
RLC radio link control
RLF radio link failure
RRC radio resource control
RRM radio resource management
SC-FDMA single carrier, frequency division multiple access
SCH shared channel
SGW serving gateway
TTI transmission time interval
UE user equipment, such as a mobile station, mobile node or mobile terminal
UL uplink (UE towards eNB)
UTRAN universal terrestrial radio access network One modern communication system is known as evolved UTRAN (E-UTRAN, also referred to as UTRAN-LTE or as E-UTRA). The DL access technique is OFDMA, and the UL access technique is SC-FDMA.

One specification of interest is 3GPP TS 36.300, V8.11.0 (2009-12), "3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8)," incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.1.0 (2009-9).

FIG. 1A reproduces FIG. 4.1 of 3GPP TS 36.300 V8.11.0, and shows the overall architecture of the EUTRAN system (Rel-8). The E-UTRAN system 2 includes eNBs, providing the E-UTRAN user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME by means of a S1 MME interface and to an S-GW by means of a S1 interface (MME/S-GW 4). The S1 interface supports a many-to-many relationship between MMEs/S-GWs and eNBs.

The eNB hosts the following functions:
functions for RRM: RRC, Radio Admission Control, Connection Mobility Control, dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or OAM); and
a measurement and measurement reporting configuration for mobility and scheduling.

Also of interest herein are the further releases of 3GPP LTE (e.g., LTE Rel-10) targeted towards future IMTA systems, referred to herein for convenience simply as LTE-Advanced (LTE-A). Reference in this regard may be made to 3GPP TR 36.913, V9.1.0 (2009-12), 3rd Generation Partnership Project; Technical Specification Group Radio Access Network; Requirements for Further Advancements for EUTRA (LTE-Advanced) (Release 9), incorporated by reference herein. A goal of LTE-A is to provide significantly enhanced services by means of higher data rates and lower latency with reduced cost. LTE-A is directed toward extending and optimizing the 3GPP L Rel-8 radio access technologies to provide higher data rates at lower cost. LTE-A will be a more optimized radio system fulfilling the ITU-R requirements for IMT-Advanced while keeping backwards compatibility with LTE Rel-8.

As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1B shows an example of CA, where M Rel-8 component carriers are combined together to form M×Rel-8 BW (e.g. 5×20 MHz=100 MHz given M=5). Rel-8 terminals receive/transmit on one CC, whereas LTE-A terminals may receive/transmit on multiple CCs simultaneously to achieve higher (wider) bandwidths.

Basically, in CA it is possible to configure a UE to aggregate a different number of CCs originating from the same eNB, of possibly different BWs, in the UL and the DL. Rel-8 UEs are assumed to be served by a single stand-alone CC, while Release 10 (LTE-A) terminals can be configured to receive or transmit simultaneously on multiple aggregated CCs in the same TTI.

As is currently specified for LTE, one subframe is equal to one millisecond, and comprises two 0.5 millisecond slots.

In addition, configured CCs can be de-activated in order to reduce the UE power consumption. In this case the UE monitoring activity of a de-activated carrier is reduced (e.g., no PDCCH monitoring and CQI measurements are needed). This mechanism can be referred to as carrier activation/de-activation.

Furthermore, to assist the eNB scheduler functionality the eNB can configure UEs to send BSRs and PHRs in the UL. Reference in this regard can be made to 3GPP TS 36.321 V9.1.0 (2009-12) Technical Specification 3rd Generation Partnership Project; Technical Specification Group Radio Access Network; Evolved Universal Terrestrial Radio Access (E-UTRA) Medium Access Control (MAC) protocol specification (Release 9), such as in Section 5.4.5 "Buffer Status Reporting" and Section 5.4.6 "Power Headroom Reporting".

The BSR indicates the amount of data the UE has available for transmission, while the PHR provides the eNB with information about the difference between the nominal UE maximum transmit power and the estimated power for UL-SCH transmission. BSRs are typically used by the eNB to select an appropriate transport block size, while PHRs are typically used to select an appropriate MCS.

BSRs are sent by the UE in the UL in the form of Buffer Status Report MAC Control Elements (see 3GPP TS 36.321, Section 6.1.3.1, "Buffer Status Report MAC Control Elements") in which the Buffer Size (BS) field identifies the total amount of data available for transmission. The length of this field is specified as 6 bits and contains exponentially distributed buffer size levels based on a minimum buffer size level ($B_{min}$), a maximum buffer size level ($B_{max}$) and a number of reported buffer size levels (N).

Reference can be made, for example, to R2-083101, "Buffer Size Levels for BSR in E-UTRA Uplink", 3GPP TSG-RAN WG2 Meeting #62bis, Warsaw, Poland, 30 Jun.-4 Jul. 2008, Source: Ericsson, Nokia Corporation, Nokia Siemens Networks, Samsung.

FIG. 3A herein reproduces FIG. 6.1.3.1-1 of 3GPP TS 36.321 and shows a Short BSR and Truncated BSR MAC control element, FIG. 3B herein reproduces FIG. 6.1.3.1-2 of 3GPP TS 36.321 and shows a Long BSR MAC control element, and FIG. 3C herein reproduces Table 6.1.3.1-1 of 3GPP TS 36.321 and shows buffer size levels for BSR.

As is stated in 3GPP TS 36.321, Section 6.1.3.1, Buffer Status Report (BSR) MAC control elements consist of either the Short BSR and Truncated BSR format, with one LCG ID field and one corresponding buffer Size field (see FIG. 3A herein) or the Long BSR format having four buffer size fields, corresponding to LCG IDs #0 through #3 (see FIG. 3B herein). In a conventional sense the LCG is understood to be a group of UL logical channels for which a single joint buffer fill level is reported by the UE in a BSR. The mapping of logical channels to LCGs is defined by the eNodeB. The BSR formats are identified by MAC PDU subheaders with LCIDs as specified in table 6.2.1-2 (FIG. 3D herein). The fields LCG ID and Buffer Size are defined as follows. LCG ID: The Logical Channel Group ID field identifies the group of logical channel(s) for which buffer status is being reported. The length of the field is 2 bits. Buffer Size: The Buffer Size field identifies the total amount of data available across all logical channels of a logical channel group after the MAC PDU has been built. The amount of data is indicated as the number of bytes. It includes all data that is available for transmission in the RLC layer and in the PDCP layer. The size of the RLC and MAC headers are not considered in the buffer size computation. The length of this field is 6 bits. The values taken by the Buffer Size field are shown in Table 6.1.3.1-1 (FIG. 3C herein).

However, the BS field as specified for LTE Rel-8 and Rel-9 is based on the assumption that only one CC is used in the UL and, as a result, is not adequate for use with the higher data rates made possible by the use of CA in Rel-10 and beyond.

SUMMARY

The foregoing and other problems are overcome, and other advantages are realized, by the use of the exemplary embodiments of this invention.

In a first aspect thereof the exemplary embodiments of this invention provide a method that comprises buffering data in a user equipment and, in response to an amount of buffered data exceeding a threshold value, triggering the generation of a buffer status report and the sending of the buffer status report to a network access node, where the threshold value is a function of the capacity of a currently allocated uplink data transmission resource and some certain amount of time.

In another aspect thereof the exemplary embodiments of this invention provide an apparatus that comprises a processor and a memory including computer program code. The memory and computer program code are configured to, with the processor, cause the apparatus at least to perform buffering data in a user equipment and, in response to an amount of buffered data exceeding a threshold value, triggering the generation of a buffer status report and the sending of the buffer status report to a network access node, where the threshold value is a function of the capacity of a currently allocated uplink data transmission resource and some certain amount of time.

In another aspect thereof the exemplary embodiments of this invention provide a method that comprises buffering data in a user equipment and, in response to an amount of buffered data exceeding a threshold value, triggering the generation of a buffer status report and the sending of the buffer status report to a network access node, where triggering the generation of the buffer status report occurs when an amount of buffered data in a buffer of a particular logical channel group exceeds a maximum value associated with one of a plurality of buffer status report tables that is currently in use.

In a still further aspect thereof the exemplary embodiments of this invention provide an apparatus that comprises a processor and a memory including computer program code. The memory and computer program code are configured to, with the processor, cause the apparatus at least to perform, buffering data in a user equipment and, in response to an amount of buffered data exceeding a threshold value, triggering the generation of a buffer status report and the sending of the buffer status report to a network access node. The triggering the generation of the buffer status report occurs when an amount of buffered data in a buffer of a particular logical channel group exceeds a maximum value associated with one of a plurality of buffer status report tables that is currently in use.

BRIEF DESCRIPTION OF THE DRAWINGS

In the attached Drawing Figures:

FIG. 3A reproduces FIG. 6.1.3.1-1 of 3GPP TS 36.321 and shows a Short BSR and Truncated BSR MAC control element, FIG. 3B reproduces FIG. 6.1.3.1-2 of 3GPP TS 36.321 and shows a Long BSR MAC control element, FIG. 3C reproduces Table 6.1.3.1-1 of 3GPP TS 36.321 and shows Buffer size levels for BSR, and FIG. 3D reproduces Table 6.2.1-21 of 3GPP TS 36.321 and shows values of the LCD for the UL-SCH.

DETAILED DESCRIPTION

The exemplary embodiments of this invention relate generally to mobile wireless communication, such as 3GPP LTE-A. The exemplary embodiments of this invention relate more specifically to the UL buffer size and the reporting of same. As was noted above, the BSR as defined in Rel-8 and Rel-9 supports a maximum buffer size of 150,000 bytes (see FIG. 3C). The exemplary embodiments of this invention address and solve this problem for the case of CA where significantly higher UL data rates can be supported.

Figure 1A:
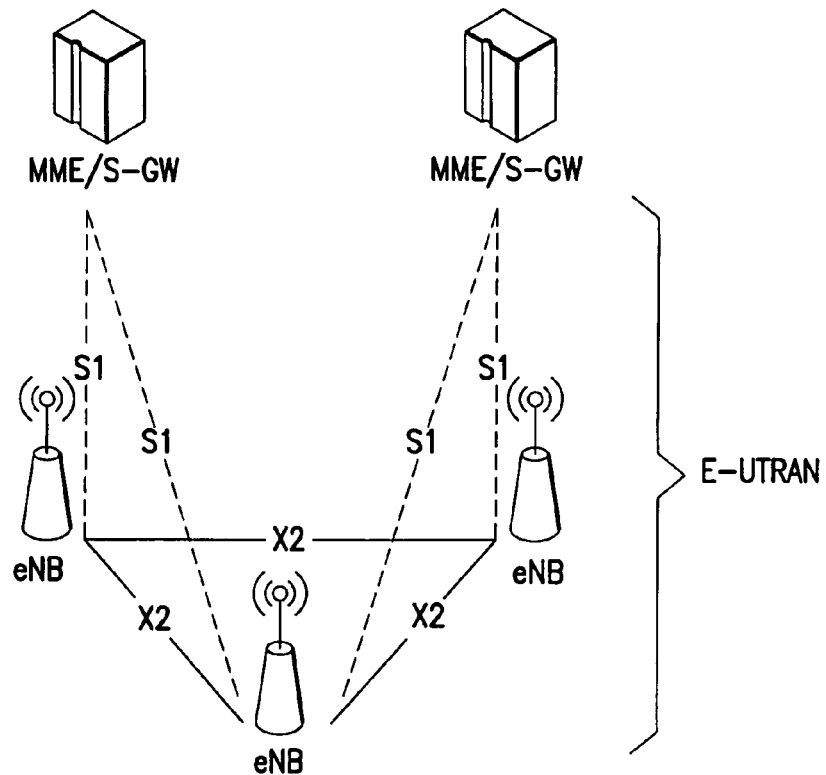
FIG. 1A reproduces FIG. 4.1 of 3GPP TS 36.300, and shows the overall architecture of the EUTRAN system.
Figure 1B:
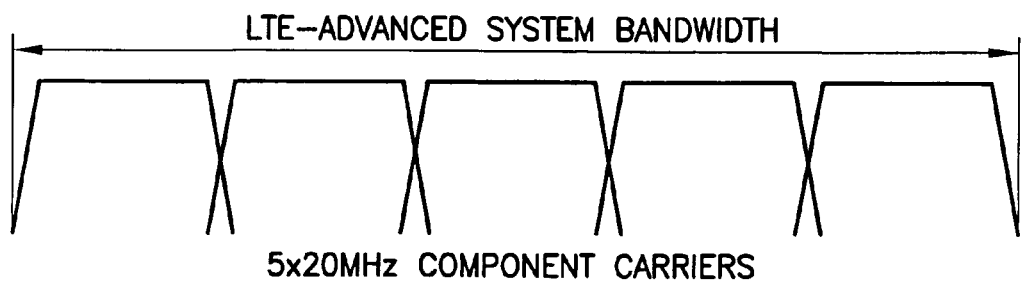
FIG. 1B shows an example of carrier aggregation as proposed for the LTE-A system.
Figure 2:
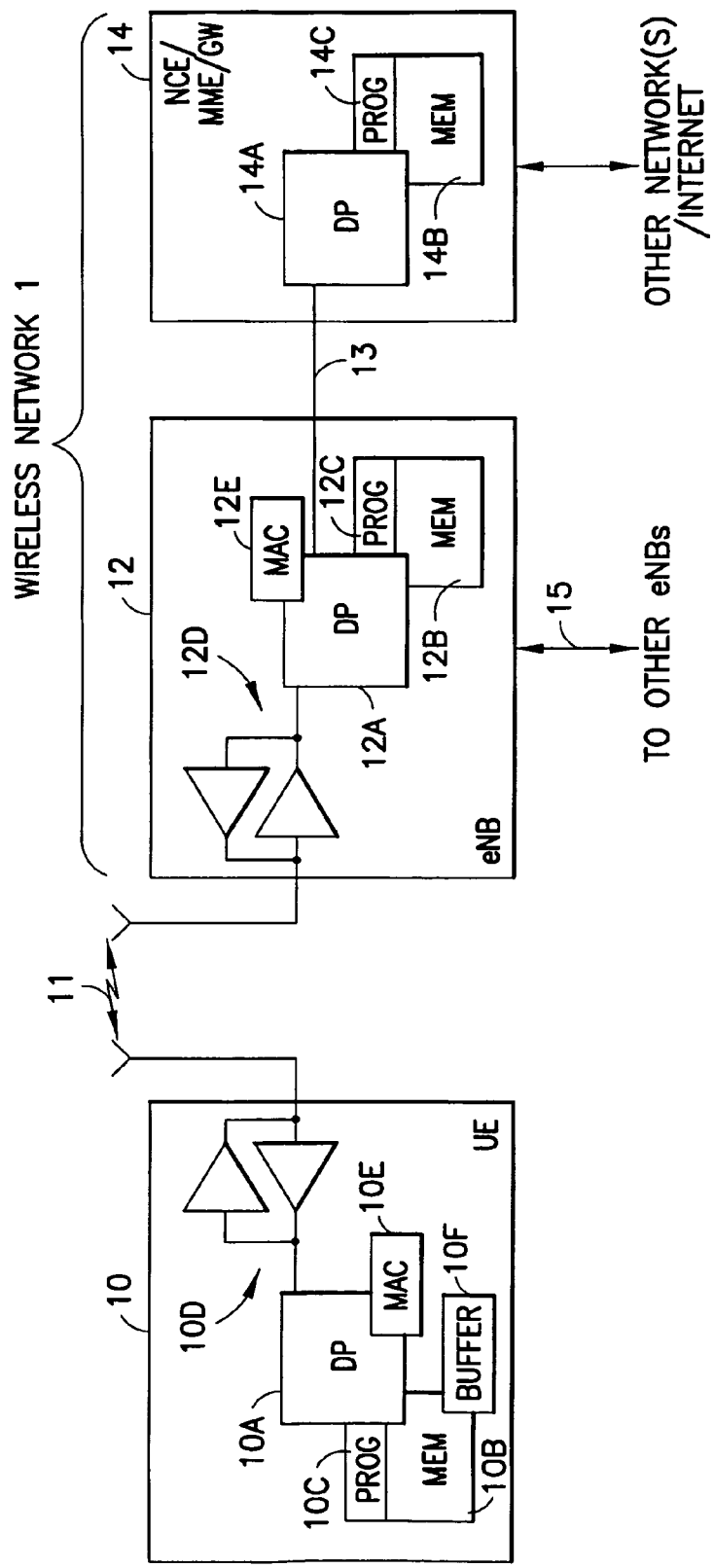
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as at least one computer or a data processor (DP) 10A, a non-transitory computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as at least one computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas (typically several when MIMO operation is in use). The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 can be assumed to also include a MAC function or module 10E, and the memory 10B can be assumed to include one or more data buffers 10F. The memory 10B can also store one or more buffer size tables. The eNB 12 can be assumed to include a corresponding MAC function or module 12E. In one exemplary embodiment the MAC modules 10E, 12E can be compatible with, and configured to operate using, the MAC procedures defined in 3GPP TS 36.321, as extended and enhanced in accordance with the exemplary embodiments of this invention.

The PROGs 10C and 12C are assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

Described now in further detail are several aspects of the exemplary embodiments of this invention.

In a first aspect of the exemplary embodiments there are introduced a plurality of buffer size level tables tailored for different maximum uplink data rates. For example one buffer size table can be provided with a maximum of 150,000 bytes, thus corresponding to the same UL data rate as in Rel-8 and Rel-9. This first table may be identical to the table shown in FIG. 3. A second table with a maximum of 300,000 bytes, corresponding to twice the UL data rate of Rel-8 and Rel-9, can also be provided to cover the case of, for example, the aggregation of two CCs in the UL. In a similar manner a third buffer size table with a maximum of 450,000 bytes, corresponding to three times the UL data rate of Rel-8 and Rel-9, can also be provided to cover the case of, for example, the aggregation of three CCs in the UL.

Figure 4:
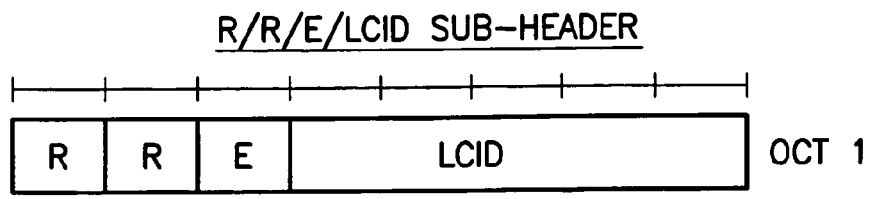
FIG. 4 shows the format of a MAC R/R/E/LCID subheader, and reproduces FIG. 6.1.2-2 of 3GPP TS 36.321.

In a second aspect of the exemplary embodiments, and when building/composing an UL BSR MAC Control Element, the MAC function 10E of the UE 10 dynamically selects the buffer size level table to be used based on the amount of data buffered. The UE 10 selects one of the tables according to the amount of data it has buffered, e.g., the UE 10 selects the table with a minimum $B_{max}$ that does not exceed its current buffer status (i.e., the table with the finest granularity). The UE 10 can then indicate to the eNB 12 which table is used via, for example, two R (reserved) bits in the MAC header for BSR (see the R/R/E/LCID sub-header shown in FIG. 4). All LCGs use the same BSR table in the Long BSR which is selected according to the LCG with the most data buffered (or alternatively according to the LCG that has triggered the BSR).

In a third aspect of the exemplary embodiments of this invention there is introduced a threshold-based BSR trigger, with the threshold being implicitly deduced by the buffer exceeding what can be supported by currently configured or allocated resource(s) within some certain time. The time can be configurable or it can be fixed so as to be the same as the response time (e.g., 16 TTIs used for calculating the maximum level for the BSR table). The threshold may be per LCG, e.g., the BSR is triggered when the buffer of a LCG exceeds the threshold such that another BSR table is to be used (i.e., the buffer exceeds the value of $B_{max}$ of the BSR table currently in use). Alternatively, the threshold value can be directly configurable by the eNB 12 in DL signaling.

In accordance with the exemplary embodiments the buffer size tables can be generated with different $B_{max}$ values and exponentially distributed buffer size levels. $B_{max}$ is determined by the number of configured/activated UL CCs and/or whether UL MIMO is configured for each CC. For example, $B_{max}$ for two UL CCs can be twice as large as for a single UL CC. The buffer size levels can be calculated in the same manner as in Rel-8: i.e., $B_k = \lceil B_{min} \cdot (1+p)^k \rceil$, where $p = (B_{max}/B_{min})^{1/(N-1)} - 1$, k is the index, N is maximum index (62 in this example with 6 bits for BS and one value reserved for an empty buffer), $B_{min} = 10$ bytes.

With, for example, the two R bits in the MAC BSR header (see again FIG. 4), up to four pre-defined tables can be supported and identified to the eNB 12, where each BRS table has a different $B_{max}$ value. The $B_{max}$ values can be determined by the data rate supported with different numbers of UL CC and/or with UL MIMO, and $B_k$ calculated the same way as in the first aspect discussed above.

For an implicit threshold, and by example, when one CC is configured for the UE 10 the BSR is triggered when the buffer status exceeds 150 Kbytes, which is the maximum value can be supported with one CC within a 16 TTI response time. Alternatively, when the allocated resource is 100 Kbyte for a certain TTI, BSR is triggered if the buffer exceeds 100 Kbytes times some certain time (e.g., 16 TTI or some configurable time), which means BSR is triggered when the buffer cannot be emptied with the currently allocated UL resource within the specified time (e.g., with 16 TTI).

For the per LCG threshold, and by example assuming the BSR table used in previous BSRs is $B_{max} = 150$ Kbytes, then BSR is triggered when the data buffer of a LCG exceeds 150 kbytes, and another BSR table is to be used.

It should be appreciated that the exemplary embodiments of this invention can be implemented in a variety of different forms. For example, it is also within the scope of the exemplary embodiments to take the operation of UL MIMO into account. As such, the BSR tables are not necessarily linked only to the number of CCs in use. As one non-limiting example, the UE 10 may store two BSR tables, with one table identical to (or substantially identical to) the table used for Rel-8 (e.g., see FIG. 3C), and a second table composed so as to cover the use case of five UL CCs plus UL MIMO.

As can be appreciated, a number of technical effects are realized by the use of the exemplary embodiments. For example, more accurate UL buffer information is provided for the eNB 12 to enable more efficient scheduling and a better determination as to whether more UL CC(s) need to be configured/activated, or whether some existing UL CC should be de-configured/deactivated. The BSR format need not change from what is already specified for Rel-8 and Rel-9, and thus the impact on the MAC protocol is minimized, i.e., 6 bits are still used for the BS for a LCG with a MAC header to indicate that it is a BSR MAC control element (CE).

Based on the foregoing it should be apparent that the exemplary embodiments of this invention provide a method, apparatus and computer program(s) to enhance the reporting of the amount of buffered data in the UE 10 to the eNB 12.

Figure 5:
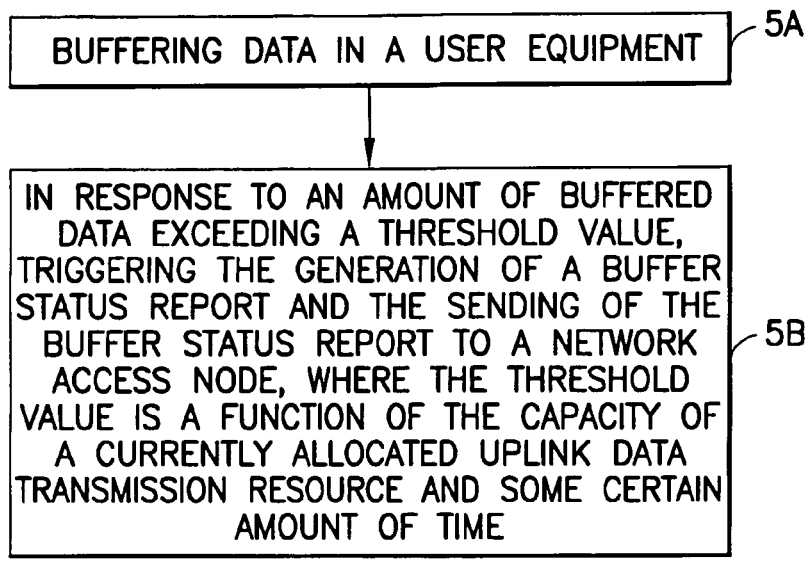
FIG. 5 is a logic flow diagram that illustrates the operation of a method, and a result of execution of computer program instructions embodied on a computer readable memory, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step of buffering data in a user equipment. In block 5B there is a step, performed in response to an amount of buffered data exceeding a threshold value, of triggering the generation of a buffer status report and the sending of the buffer status report to a network access node, where the threshold value is a function of the capacity of a currently allocated uplink data transmission resource and some certain amount of time.

In accordance with the foregoing method, where the uplink data transmission resource comprises one or more component carriers, and where the capacity increases as the number of component carriers increases.

In accordance with the foregoing method, where the time is expressed in transmission time intervals (TTIs).

In accordance with the foregoing method, where the threshold value is per logical channel group.

In accordance with the foregoing method, where the threshold value is related to a maximum amount of buffered data supported by a buffer status table that is currently in use by the user equipment.

In accordance with the foregoing method, where the threshold value is related to a maximum amount of time that is available during which the buffered data can be transmitted to the network access node using the currently allocated uplink data transmission resource.

In accordance with the foregoing method, where the uplink data transmission resource comprises one or more component carriers, where the capacity increases as the number of component carriers increases, and where the time is expressed in transmission time intervals.

In accordance with the foregoing method, where the user equipment stores a plurality of buffer status report tables, individual ones of which correspond to an individual one of a number of component carriers allocated to the user equipment for transmitting data on the uplink.

In accordance with the foregoing method, where the user equipment stores a plurality of buffer status report tables, where each of the plurality of buffer status report tables has a different maximum value and granularity.

In accordance with the foregoing method, where the user equipment stores a plurality of buffer status report tables, and where at least one of the plurality of buffer status report tables is composed in consideration of a number of uplink component carriers in use and in consideration of uplink multiple input/multiple output operation.

In accordance with the foregoing method, where triggering the generation of a buffer status report occurs when an amount of buffered data in a buffer of a particular logical channel group exceeds a maximum value associated with one of a plurality of buffer status report tables that is currently in use.

In accordance with the foregoing method as explained in the preceding paragraph, where the user equipment selects the buffer status report table that is currently in use according to an amount of buffered data by selecting the buffer status report table that has the smallest maximum value that does not exceed the amount of currently buffered data.

In accordance with the foregoing method as explained in the preceding paragraph, and further comprising identifying the selected buffer status report table to the network access node using at least one bit in a medium access control buffer status report header.

In accordance with the foregoing method, performed as a result of execution of computer program instructions stored in a non-transitory computer-readable medium that comprises part of the user equipment.

Figure 6:
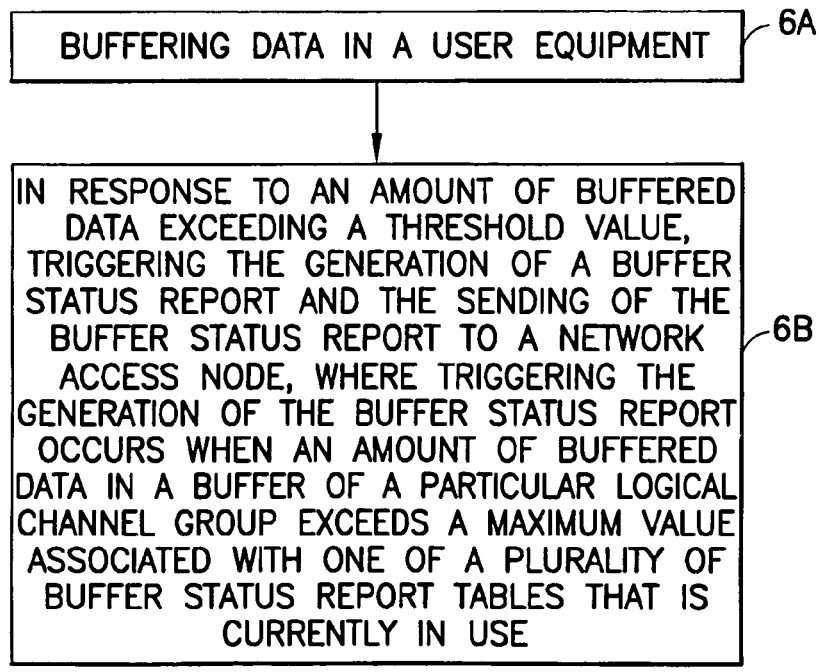
FIG. 6 is a logic flow diagram that illustrates the operation of a method, and a result of execution of computer program instructions embodied on a computer readable memory, further in accordance with the exemplary embodiments of this invention.

FIG. 6 is a logic flow diagram that illustrates the operation of a method, and a result of execution of computer program instructions, further in accordance with the exemplary embodiments of this invention. In accordance with these exemplary embodiments a method performs, at Block 6A, a step of buffering data in a user equipment. At Block 6B there is a step performed, in response to an amount of buffered data exceeding a threshold value, of triggering the generation of a buffer status report and the sending of the buffer status report to a network access node, where triggering the generation of the buffer status report occurs when an amount of buffered data in a buffer of a particular logical channel group exceeds a maximum value associated with one of a plurality of buffer status report tables that is currently in use.

In accordance with the foregoing method, where the user equipment selects the buffer status report table that is currently in use according to an amount of buffered data by selecting the buffer status report table that has the smallest maximum value that does not exceed the amount of currently buffered data.

In accordance with the foregoing method, and further comprising identifying the selected buffer status report table to the network access node using at least one bit in a medium access control buffer status report header.

In accordance with the foregoing method, where the medium access control buffer status report header also identifies the particular logical channel group.

The various blocks shown in FIGS. 5 and 6 may be viewed as method steps, and/or as operations that result from operation of computer program code, and/or as a plurality of coupled logic circuit elements constructed to carry out the associated function(s). That is, also encompassed by these exemplary embodiments are apparatus that are configured to operate so as to execute the exemplary methods described above with respect to FIGS. 5 and 6.

Also encompassed by these exemplary embodiments is an apparatus, such as a network access node (e.g., the eNB 12), that is configured to respond to and interpret the BSRs received on the UL from the UE 10.

The exemplary embodiments also pertain to an apparatus that comprises means for buffering data in a user equipment and means, responsive to an amount of buffered data exceeding a threshold value, for triggering the generation of a buffer status report and the sending of the buffer status report to a network access node, where the threshold value is a function of the capacity of a currently allocated uplink data transmission resource and some certain amount of time.

The exemplary embodiments also pertain to an apparatus that comprises means for buffering data in a user equipment and means, responsive to an amount of buffered data exceeding a threshold value, for triggering the generation of a buffer status report and the sending of the buffer status report to a network access node, where triggering the generation of the buffer status report occurs when an amount of buffered data in a buffer of a particular logical channel group exceeds a maximum value associated with one of a plurality of buffer status report tables that is currently in use.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE-A system, it should be appreciated that the exemplary embodiments of this invention are not limited for use with only this particular types of wireless communication system and that they may be used to advantage in other wireless communication systems, such as systems where component aggregation is employed.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, channels and message elements are not intended to be limiting in any respect, as these parameters, channels and message elements may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   buffering data in a user equipment; and
   in response to an amount of buffered data exceeding a threshold value, triggering the generation of a buffer status report and the sending of the buffer status report to a network access node, where the threshold value is a function of the capacity of a currently allocated uplink data transmission resource and some certain amount of time; where the user equipment stores a plurality of buffer status report tables, where each of the plurality of buffer status report tables has a different maximum value and granularity;
   where each buffer status report table corresponds to a different maximum uplink data rate and comprises a plurality of entries each identified by an index and a buffer size indicating an amount of data that is buffered for uplink transmission, where the maximum uplink data rate and the maximum value of data buffered for uplink transmission is dependent upon at least the currently allocated uplink data transmission resource that comprises at least a number of uplink component carriers that are allocated for use; and
   identifying in uplink signaling to the network access node which one of the plurality of buffer status report tables is currently applicable to data buffered in the user equipment for uplink transmission.

2. The method of claim 1, where the uplink data transmission resource comprises one or more component carriers, and where the capacity increases as the number of component carriers increases.

3. The method of claim 1, where the time is expressed in transmission time intervals.

4. The method of claim 1, where the threshold value is per logical channel group.

5. The method as in claim 4, where the threshold value is related to a maximum amount of buffered data supported by a buffer status table that is currently in use by the user equipment.

6. The method of claim 1, where triggering the generation of a buffer status report occurs when an amount of buffered data in a buffer of a particular logical channel group exceeds a maximum value associated with one of a plurality of buffer status report tables that is currently in use.

7. The method of claim 6, where the user equipment selects the buffer status report table that is currently in use according to an amount of buffered data by selecting the buffer status report table that has the smallest maximum value that does not exceed the amount of currently buffered data.

8. The method of claim 7, further comprising identifying the selected buffer status report table to the network access node using at least one bit in a medium access control buffer status report header.

9. The method of claim 1, where the threshold value is related to a maximum amount of time that is available during which the buffered data can be transmitted to the network access node using the currently allocated uplink data transmission resource.

10. The method of claim 9, where the uplink data transmission resource comprises one or more component carriers, where the capacity increases as the number of component carriers increases, and where the time is expressed in transmission time intervals.

11. The method of claim 1, where individual ones of the plurality of buffer status report tables-correspond to an individual one of a number of component carriers allocated to the user equipment for transmitting data on the uplink.

12. The method of claim 1, where at least one of the plurality of buffer status report tables is composed in consideration of a number of uplink component carriers in use and in consideration of uplink multiple input/multiple output operation.

13. The method as in claim 1, performed as a result of execution of computer program instructions stored in a non-transitory computer-readable medium that comprises part of the user equipment.

14. An apparatus, comprising:
    a processor; and
    a memory including computer program code, where the memory and computer program code are configured to, with the processor, cause the apparatus at least to perform,
    buffering data in a user equipment; and
    in response to an amount of buffered data exceeding a threshold value, triggering the generation of a buffer status report and the sending of the buffer status report to a network access node, where the threshold value is a function of the capacity of a currently allocated uplink data transmission resource and some certain amount of time; where the user equipment stores a plurality of buffer status report tables, where each of the plurality of buffer status report tables has a different maximum value and granularity;
    where each buffer status report table corresponds to a different maximum uplink data rate and comprises a plurality of entries each identified by an index and a buffer size indicating an amount of data that is buffered for uplink transmission, where the maximum uplink data rate and the maximum value of data buffered for uplink transmission is dependent upon at least the currently allocated uplink data transmission resource that comprises at least a number of uplink component carriers that are allocated for use; and identifying in uplink signaling to the network access node which one of the plurality of buffer status report tables is currently applicable to data buffered in the user equipment for uplink transmission.

15. The apparatus of claim 14, where the uplink data transmission resource comprises one or more component carriers, and where the capacity increases as the number of component carriers increases.

16. The apparatus of claim 14, where the time is expressed in transmission time intervals.

17. The apparatus of claim 14, where the threshold value is per logical channel group.

18. The apparatus as in claim 17, where the threshold value is related to a maximum amount of buffered data supported by a buffer status table that is currently in use by the user equipment.

19. The apparatus of claim 14, where triggering the generation of a buffer status report occurs when an amount of buffered data in a buffer of a particular logical channel group exceeds a maximum value associated with one of a plurality of buffer status report tables that is currently in use.

20. The apparatus of claim 19, where the user equipment selects the buffer status report table that is currently in use according to an amount of buffered data by selecting the buffer status report table that has the smallest maximum value that does not exceed the amount of currently buffered data.

21. The apparatus of claim 20, further comprising identifying the selected buffer status report table to the network access node using at least one bit in a medium access control buffer status report header.

22. The apparatus of claim 14, where the threshold value is related to a maximum amount of time that is available during which the buffered data can be transmitted to the network access node using the currently allocated uplink data transmission resource.

23. The apparatus of claim 22, where the uplink data transmission resource comprises one or more component carriers, where the capacity increases as the number of component carriers increases, and where the time is expressed in transmission time intervals.

24. The apparatus of claim 14 where individual ones of the buffer status report tables correspond to an individual one of a number of component carriers allocated to the user equipment for transmitting data on the uplink.

25. The apparatus of claim 14, where at least one of the plurality of buffer status report tables is composed in consideration of a number of uplink component carriers in use and in consideration of uplink multiple input/multiple output operation.

26. A method, comprising:
buffering data in a user equipment; and
in response to an amount of buffered data exceeding a threshold value, triggering the generation of a buffer status report and the sending of the buffer status report to a network access node, where triggering the generation of the buffer status report occurs when an amount of buffered data in a buffer of a particular logical channel group exceeds a maximum value associated with one of a plurality of buffer status report tables that is currently in use; where the user equipment stores a plurality of buffer status report tables, where each of the plurality of buffer status report tables has a different maximum value and granularity;
where each buffer status report table corresponds to a different maximum uplink data rate comprises a plurality of entries each identified by an index and a buffer size indicating an amount of data that is buffered for uplink transmission, where the maximum uplink data rate and the maximum value of data buffered for uplink transmission is dependent upon at least a currently allocated uplink data transmission resource that comprises at least a number of uplink component carriers that are allocated for use; and
identifying in uplink signaling to the network access node which one of the plurality of buffer status report tables is currently applicable to data buffered in the user equipment for uplink transmission.

27. The method of claim 26, where the user equipment selects the buffer status report table that is currently in use according to an amount of buffered data by selecting the buffer status report table that has the smallest maximum value that does not exceed the amount of currently buffered data.

28. The method of claim 27, further comprising identifying the selected buffer status report table to the network access node using at least one bit in a medium access control buffer status report header.

29. The method of claim 28, where the medium access control buffer status report header also identifies the particular logical channel group.

30. An apparatus, comprising:
a processor; and
a memory including computer program code, where the memory and computer program code are configured to, with the processor, cause the apparatus at least to perform,
buffering data in a user equipment; and
in response to an amount of buffered data exceeding a threshold value, triggering the generation of a buffer status report and the sending of the buffer status report to a network access node, where triggering the generation of the buffer status report occurs when an amount of buffered data in a buffer of a particular logical channel group exceeds a maximum value associated with one of a plurality of buffer status report tables that is currently in use; where the user equipment stores a plurality of buffer status report tables, where each of the plurality of buffer status report tables has a different maximum value and granularity;
where each buffer status report table corresponds to a different maximum uplink data rate and comprises a plurality of entries each identified by an index and a buffer size indicating an amount of data that is buffered for uplink transmission, where the maximum uplink data rate and the maximum value of data buffered for uplink transmission is dependent upon at least a currently allocated uplink data transmission resource that comprises at least a number of uplink component carriers that are allocated for use; and
identifying in uplink signaling to the network access node which one of the plurality of buffer status report tables is currently applicable to data buffered in the user equipment for uplink transmission.

31. The apparatus of claim 30, where the user equipment selects the buffer status report table that is currently in use according to an amount of buffered data by selecting the buffer status report table that has the smallest maximum value that does not exceed the amount of currently buffered data.

32. The apparatus of claim 31, further comprising identifying the selected buffer status report table to the network access node using at least one bit in a medium access control buffer status report header, where the medium access control buffer status report header also identifies the particular logical channel group.

\* \* \* \* \*